United States Patent
Wesby et al.

(10) Patent No.: US 6,799,044 B1
(45) Date of Patent: Sep. 28, 2004

(54) METHOD AND SYSTEM FOR MOBILE COMMUNICATIONS

(75) Inventors: Philip Wesby, Espoo (FI); Alexander Esser, Espoo (FI); Matti Manninen, Espoo (FI); Hannu Multimäki, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/807,763

(22) PCT Filed: Oct. 21, 1999

(86) PCT No.: PCT/FI99/00876

§ 371 (c)(1), (2), (4) Date: Aug. 20, 2001

(87) PCT Pub. No.: WO00/24206

PCT Pub. Date: Apr. 27, 2000

(30) Foreign Application Priority Data

Oct. 21, 1998 (FI) .................................. 982280

(51) Int. Cl.[7] ................................................ H04B 7/26
(52) U.S. Cl. ................ 455/452.1; 455/63.1; 455/67.13; 455/436
(58) Field of Search ........................ 455/450, 464, 455/513, 509, 451, 452.1, 452.2, 443, 444, 437, 436, 63.1, 67.1–67.3, 114.2

(56) References Cited

U.S. PATENT DOCUMENTS

| | | | | |
|---|---|---|---|---|
| 5,594,949 A | | 1/1997 | Andersson et al. ............ 455/62 |
| 5,606,727 A | * | 2/1997 | Ueda ............................ 455/513 |
| 5,666,655 A | * | 9/1997 | Ishikawa et al. ............. 455/512 |
| 6,128,327 A | * | 10/2000 | Bird et al. .................... 375/132 |
| 6,131,035 A | * | 10/2000 | Ohkubo et al. .............. 455/450 |
| 6,148,209 A | * | 11/2000 | Hamalainen et al. ........ 455/450 |
| 6,223,031 B1 | * | 4/2001 | Naslund ....................... 455/423 |
| 6,229,792 B1 | * | 5/2001 | Anderson et al. ............ 370/280 |
| 6,449,462 B1 | * | 9/2002 | Gunnarsson et al. ...... 455/67.13 |
| 6,597,705 B1 | * | 7/2003 | Rezaiifar et al. ............ 370/468 |

FOREIGN PATENT DOCUMENTS

| | | |
|---|---|---|
| FI | 100575 B | 12/1997 |
| FI | 943818 | 2/1998 |
| WO | WO 95/24810 | 9/1995 |
| WO | WO 95/26593 | 10/1995 |
| WO | WO 96/29837 | 9/1996 |
| WO | WO 97/32444 | 9/1997 |
| WO | WO 98/27763 | 6/1998 |
| WO | WO 98/48856 | 11/1998 |

* cited by examiner

*Primary Examiner*—Edward F. Urban
*Assistant Examiner*—Huy Phan
(74) *Attorney, Agent, or Firm*—Harrington & Smith, LLP (57) ABSTRACT

A method for a radio channel allocation for telecommunication networks, comprising fixed transceivers (BTS) and fixed or mobile radio stations (MS). The method comprises a step of performing channel allocation for a particular radio connection to a radio station based upon signal to interference estimates for the radio station. A system and a base station controller are also disclosed.

24 Claims, 6 Drawing Sheets

METHOD AND SYSTEM FOR MOBILE COMMUNICATIONS

TECHNICAL FIELD OF THE INVENTION

The invention relates to a system and method for mobile communications, especially for dynamic radio channel allocation in a mobile communications network

DESCRIPTION OF RELATED ART

In a digital mobile network the ability to property receive and decode a radio signal depends on the carrier-to-interference strength ratio C/I at the receiver. Clearly, a too low C/I will result in bad quality or the total loss of the radio connection. On the other hand, radio communications quality does not become significantly better for a very high C/I ratio since the transmission method is designed to cope with a certain amount of noise such that above a certain C/I level a received signal can be properly demodulated and decoded. However, a too high C/I does not maximise capacity of the network. Either the carrier strength C should be lowered to reduce the interference generated to other receivers or more interference should be permitted to be generated by other transmitters. This provides a means to get more capacity out of the available radio spectrum, Correspondingly, excessive C/I translates to a loss in capacity.

The application WO 97/32444 provides a method for allocating frequency channels to cells in a cellular telephone system. The application relates to automatic allocation of frequency channels to cells in a cellular telephone system. The uplink signal quality is measured in terms of uplink interference level. For selected frequency channels, uplink interference levels are measured by the corresponding transceivers. The signal to interference ratio for the radio station is calculated from the measurements of the uplink signal quality and the uplink interference level.

Another application U.S. Pat. No. 5,594,949 provides a method and apparatus for locally estimating the interference on downlink channels available to a base station to determine candidate channels for new calls. When a new connection is to be established with a mobile station, the base station signals those mobile stations already connected to make interference measurements. These measurements are then used to estimete the interference which a new connection will have in the downlink. The base station measures the received signal strength of a mobile station on the control channel and based on that measurement, estimates the signal strength which the mobile station wit receive from the base. Based on said interference measurements and said signal strength measurement the base station BTS then calculates the carrier-to interference ratio.

This leads to the well-known ultimate goal that C/I should be homogeneously distributed over all receivers in the network at any point in time.

However, in current GSM networks (Global System for Mobile communication), this goal is far from being realised. The following statements summarise the current status quo:

The frequency plan is fixed, i.e. each base station transceiver (TRX is being assigned one frequency or one frequency hopping sequence. This prevents the allocation of a channel, i.e. frequency and TDMA (time division multiple access) time slot (TS), to a mobile station (MS) according to the criterion of spreading out C/I. In general, handover (HO) and power control (PC) decisions are not based on C/I, but on other less adequate quantities such as field strength (FS) and quality (meaning bit error rate). Some C/I measurements can be provided by base stations BTS, but they are limited and for uplink direction (MS to BTS) only. For neighbour cells, only FS measurements on the BCCH frequency (control channel) are performed. HOs are made without direct knowledge of the radio conditions on non-BCCH frequencies.

Frequency hopping (FH) provides statistical interference spreading in time, but no active interference management is currently implemented, In the soft-capacity enhancement feature Intelligent Underlay Overlay (IUO), the evaluation of C/I is done on a cell-by-cell basis and averaged over all 8 TSs of a TDMA frame. Here, C/I represents a worst case scenario rather than the actual C/I at a MS. In the conventional concept of Automatic Frequency Planning (AFP), the fixed frequency plan is periodically improved according to C/I criteria. C/I is calculated from the live network traffic, but, as with IUO, the resulting C/I matrix refers to interference between cell areas, not as experienced by the MSs themselves. Additionally, there remains the major problem to get the huge amount of measurement data from the base station controller BSC to an external AFP tool. In conclusion, in GSM networks today C/I is not homogeneously distributed over the receivers.

SUMMARY OF THE INVENTION

The proposed solution of the invention improves upon current networks, completely with the domain of GSM. The major benefits are:

C/I is determined at each MS and is continuously tracked. This allows the network to detect insufficient or excessive C/I for each MS and furthermore to assess the overall downlink C/I distribution of the network. Local and global interference management is made possible.

Handover, i.e. HOs and downlink Power Control (PC) are based on C/I criteria. The network compares the effects that potential HOs or downlink PC decisions would have on all the MSs which would be affected by such a decision. Thus, HOs and downlink PC decisions are C/I-based. There is less risk for dropped calls due to interference. Due to such C/I-based HOs, the network can increase C/I for MSs with too-low C/I and decrease C/I for MSs with too-high C/I, thus homogenise C/I across all MSs, in order to come as close as possible to the most homogeneous C/I distribution.

There is basically no frequency planning except for the BCCH Frequencies are allocated, as required, for channel allocation and HO as determined by C/I consideration. Each TS within a TRX can be allocated a different frequency as opposed to having fixed frequency assignments per TRX. There is no frequency hopping (FH), i.e. the frequency used on a channel does not generally change from frame to frame.

The neighbour cell list each MS receives after each HO is performed is specified as follows. MSs can be given dedicated neighbour lists according to various criteria, such as C/I, speed, traffic, rapid field drop, etc. This makes possible the management of different overlaying network layers, e.g. macro and micro layers, or Where reporting of different sets of neighbour cells is required to make an optimal channel allocation decision. Downlink C/I spreading is only constrained if local traffic exceeds the local hard capacity limit, given for each cell by the number of installed TRXs.

All this C/I spreading results in substantial capacity and quality gains. An effective frequency reuse between 3 and 3.5 without sacrificing quality is expected. Capacity and quality are balanced according to the actual traffic.

Interference management is focused on the radio conditions at the MS itself instead of according to a cell average. In this regard the network can be viewed as a "single logical cell", with the MS being monitored along its own trajectory through the network.

The invention can also be considered as a vastly improved IUO without planning, where C/I measurements now represent the actual behaviour at a MS.

According to a first aspect of the invention there is provided a method for a radio channel allocation in a telecommunication networks, comprising fixed transceivers and mobile radio stations, the method being characterized in that it comprises the steps of calculating a signal to interference estimate for the radio station, and performing channel allocation for a particular radio connection to a radio station based upon the calculated signal to interference estimate for the radio station.

According to a second aspect of the invention there is provided a mobile communications network comprising a number of base stations, each base station being capable of transmitting radio signals to and receiving radio signals from the area of an associated cell for communication with a mobile station in the associated cell, a base station controller to which a number of said base stations are connected, the network being characterized in that the it comprises means for calculating a signal to interference estimate for the mobile station, and means for performing channel allocation for a particular radio connection to the mobile station based upon the calculated signal to interference estimate for the mobile station.

According to a third aspect of the invention there is provided a base station controller for supervising a number of base stations connected to the base station controller and for supervising communication to mobile stations being connected to one of the base stations over a radio connection, the base station controller being characterised in that the it comprises means for calculating a signal to interference estimate for the mobile station, and means for performing channel allocation for the radio connection to the mobile station based upon the calculated signal to interference estimate for the mobile station.

At the network the C/I ratios of the different mobile stations MS are determined by the base station controller BSC. Already in present networks, most of the data required to calculate the downlink carrier strength C and the interference I exists in the BSC. The BSC knows which BTS transmits at which frequency and at what transmission power.

Relating this information to each MS's field strength measurements on the serving channel and on the BCCH frequency is enough to calculate the actual and potential C/I ratio.

A requirement to know the relative timing between the transmissions of different BTSs is not available in standard GSM systems where BTSs operate autonomously and where their transmissions are not synchronised with each other. The invention can be used to align the time slots of different BTSs connected to one and the same BSC. Actually, the invention provides the justification to implement Time Slot Alignment.

Further benefits of the invention are given for achieving a self-regulating network:

The need for frequency planning mostly vanishes. AFP becomes unnecessary, since non-BCCH frequencies are not pre-assigned, but allocated in a truly dynamic way. The remaining BCCH frequency planning can much more easily be automated with the invention in place and probably will not require conventional AFP.

The invention supersedes IUO. Thus, the fairly complicated and time consuming planning effort for IUO is not needed.

The invention works without FH. Thus, all planning related to FH or IFH (=intelligent frequency hopping), e.g. the choice of hopping sequences and hopping sequence numbers, is not needed.

HOs and downlink PC are much simplified. There are fewer parameters, and most of them can be planned and refined more easily, since they relate more closely to interference control, network quality, traffic control and hard capacity. Conventional HOs and PC methods may still be required to deal with inter-BSC HOs and special situations such as uplink problems, but since they will be invoked much more seldom, the need for refining parameters is reduced.

Traffic control, i.e. dynamic shifts of capacity between cells by means of traffic handovers become much easier automatable, since there is direct relationship between soft capacity and the C/I target, which controls the HO and PC processes. It is possible to classify subscribers with different rates according to the different carrier to interference ratio.

Considering this all together, time slot alignment together with the allocation according to the invention provide a major step towards a Self-Regulating Network, where most network parameters are either not necessary any more or are automatically tuned by the network according to measurements and statistics gathered in the live network.

DETAILED DESCRIPTION OF EMBODIMENTS

A separate patent application entitled "Network Synchronisation and Method of Synchronisation of a Network" WO-A-9957826 shows a method in which it is specified how to achieve time slot alignment at the air interface. This separate patent application discloses how down-link transmissions from a number of base stations (BTS's) are processed by the base station controller (BSC). The BSC then determines how much each base station's transmissions must be adjusted by, to align all transmissions to within a meaningful timeframe and hence synchronise the network. This separate patent application discloses how to detect differences in frame number and time slot between base stations over the air interface. This provides the BSC with the knowledge of the time differences between each BTS's transmissions on each of its 8 time slots.

Time slot alignment of BTS transmissions provides several direct benefits such as synchronised handovers which remove audible clicks. However, time slot alignment provides the foundation for additional solutions which increase the capacity of the network by reducing the frequency reuse.

Figure 1:
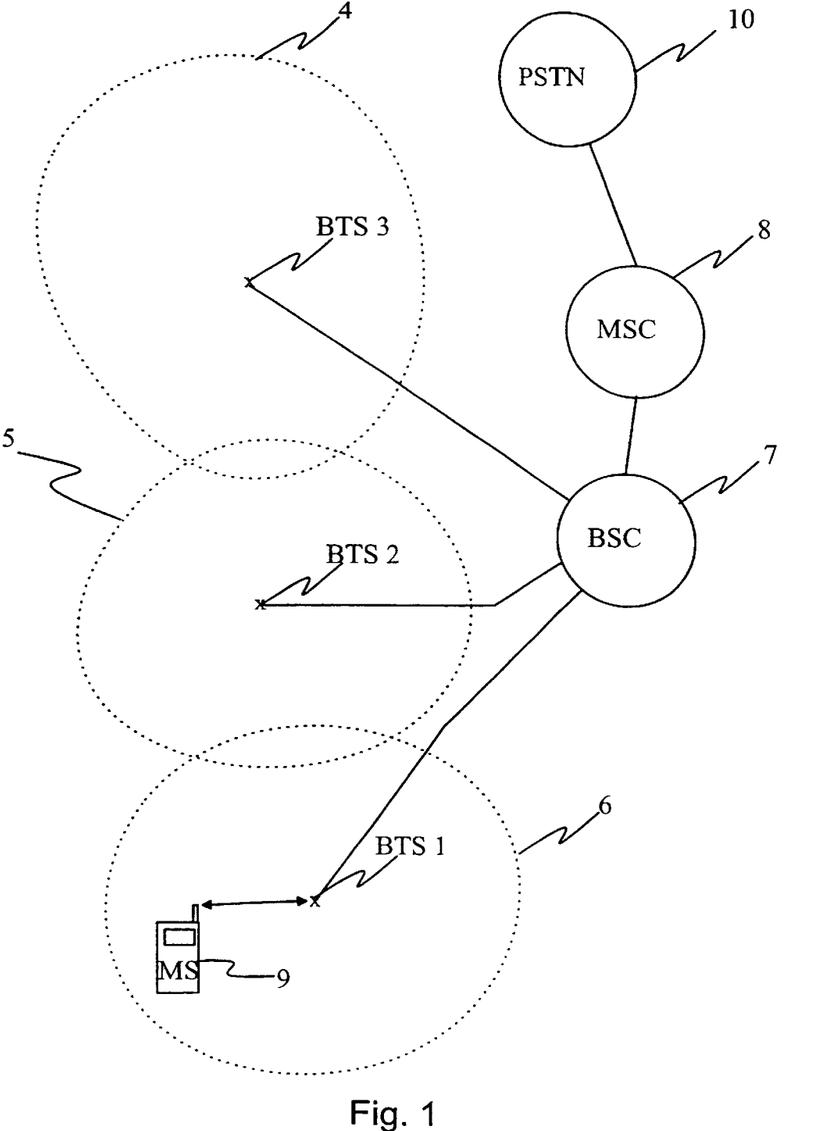
FIG. 1 shows schematically the telecommunications network.

FIG. 1 shows schematically telecommunications network. The network comprises a number of base stations (BTSs) 1, 2, 3 etc. Each base station BTS has a radio transceiver capable of transmitting radio signals to and receiving radio signals from the area of an associated cell 4, 5, 6. By means of these signals the base station can communicate with the mobile station 9 which may be located in an associated cell. This mobile station terminal 9 itself includes a radio transceiver. Each base station is connected via a bass station controller (BSC) 7 to a mobile switching centre (MSC) which is linked in turn to the public telephone network (PSTN) 10 or to other mobile switching centres (not shown). By means of this system a user of the mobile sation can establish a telephone call or corresponding connection to a destination which can be subscriber in the PSTN or another mobile station in mobile network or even terminal in the computer network (not shown).

The following sections describe the requirements for the invention for each of the different network elements. All requirements are compatible with the well known GSM system and can be used with other mobile communication systems like CDMA, but we have specified it relating to GSM as an example.

Figure 2:
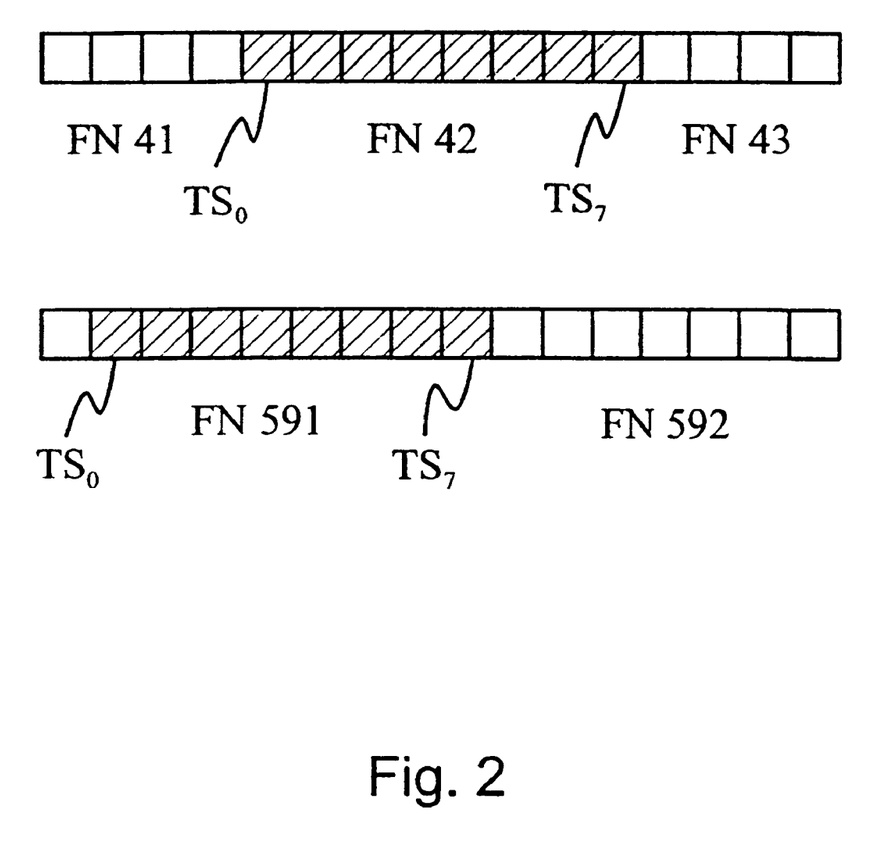
FIG. 2 shows time slot alignment with known frame offsets.

FIG. 2 shows time slot alignment with known frame offsets. The network is required to be synchronised, which means in this context that BTS burst transmissions are simultaneous, i.e. all BTSs' time slots are aligned with each other. TDMA frame boundaries and frame numbers do not have to be synchronised, but the BSC has to be aware of the differencies between frame boundaries and frame numbers between all the BTSs (FIG. 2).

The solutions how to achieve this synchronisation are described in detail in the above referenced patent application WO-A-9957826. For most of this invention, all BTSs controlled by the same BSC are assumed to be synchronised in this way.

For optimal functioning of the invention the occurance of channel interference at any point in the network shuld be avoided. Co-channel interference is generated from bursts transmitted on the same frequency but in adjacent TSs. This depends on the accuracy with which time slot alignment is achieved and on the distance across which co-channel interference is significant which in turn depends on the BTS transmission power. Distances and transmission powers are chosen such that the nearest neighbour sites are considered as potentially strong interferers, and next-to-nearest neighbour sites as potentially weak interferers. Accordingly significant co-channel interference can be avoided by correct network planning, which as such is known to a person skilled in the art. The target accuracy of the cited solution for time slot alignment is 5 $\mu$s. The separation between two bursts in successive TSs has to be, according to GSM specifications, at least 14 $\mu$s between the points on the power ramp −6 dB below the nominal transmit power. It is therefore safe to assume that there is zero interference between bursts transmitted on the same frequency but in adjacent TSs, if BTSs which are close enough to potentially interfere, are at least about 1.5 km apart (Note that 1.5 km correspond to 5 $\mu$s propagation delay.)

This synchronisation accuracy corresponds to a minimum of about 0.5 sites per km$^2$ if only nearest neighbours are potentially interferers, or to a minimum of about 2 sites per km$^2$ if also next-to-nearest neighbour sites are potential interferers. (It will be understood that both numbers relate to a regular network). In a highly dense urban area, this requirement is already met for the macro layer, for which the typical maximal density is about 3 sites per km$^2$.

A contiguous BCCH frequency band with loose reuse is deployed.

Basically, all other frequencies are not associated with any TRX. Thus, no frequency planning is required for non-BCCH frequencies.

BSC boundaries are an exception. Along either side of each BSC boundary, disjoint frequency groups are associated with the cells close to the boundary, such that the interference, crossing each BSC boundary, is negligible for the invention. This is similar to frequency planning along national borders where different networks using the same frequency band are not allowed to interfere each other significantly.

Neither FM, nor IUO or IFH are used. The invention goes beyond these current capacity solutions and therefore includes their essential benefit.

Different layers, e.g. macro and micro layer, will, in general, require separate BCCH and non-BCCH frequency bands. However, sharing the frequency bands for BCCH and non-BCCH frequencies among different layers does not generally invalidate the invention solution. This means that the invention also works in those cases where the same frequencies are used in different network layers (meaning macro, micro, and pico cell layers).

Since the channels on the BCCH frequency are also used for initial channel allocation, one "safe", i.e. loosely reused, frequency per cell might not be sufficient for very high capacity cells. If this happens, one extra TRX can be assigned a fixed, loosely reused, frequency from a separate frequency band. This corresponds to assigning more than one TRX to the regular layer in IUO.

The BTS, more precisely the transceiver of the BTS, must be capable of changing the frequency on every TS. TRXs for synthesised FH typically only change their frequency every TDMA frame, i.e. for every 8$^{th}$ TS. However, new BTS can be specified for independent FH sequences on each TS, so the requirements for the invention should be met without any hardware modifications to the BTS.

The BTS must assign and unassign frequencies independently for each TS as commanded by the BSC.

In following it will described what kind of development is required at the base station controller BSC in addition to what is required for the basic synchronisation solution. Furthermore, in implementing a BSC according to the invention sufficient real-time processing power and storage is needed at the BSC. In following a method for dynamic estimation of carrier strengths and interference will be described.

Figure 3:
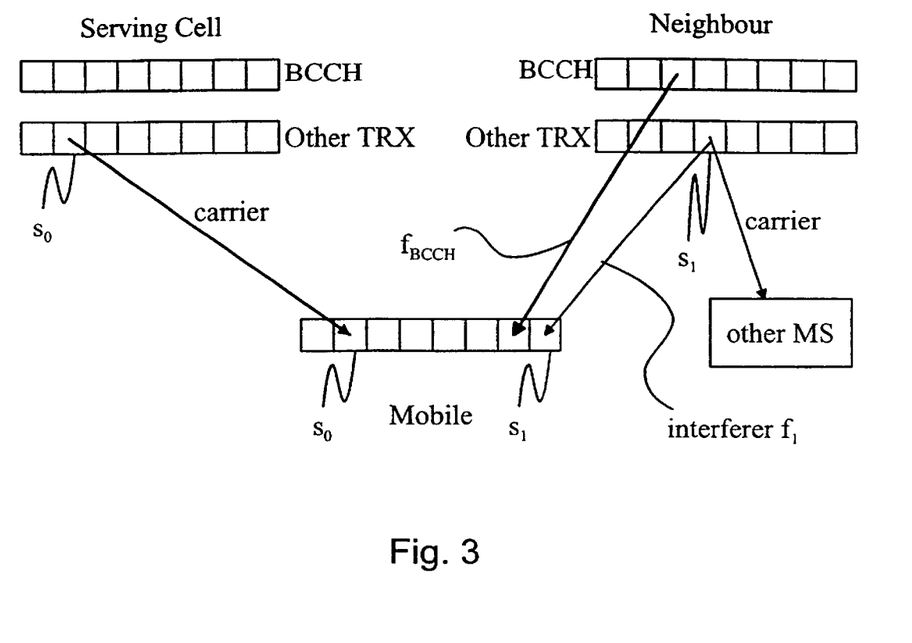
FIG. 3 shows how to determine C/I in a synchronised network.

Having a synchronised network enables the BSC to estimate C/I as experienced by a MS on the serving channel. Similarly, the BSC can estimate the potential C/I which a MS would experience if it were served on any other channel in a synchronised network (FIG. 3). How this is done is explained when referring to the FIG. 3.

In the following it will be described how to estimate maximum potential carrier strengths on neighbour cells.

Since the BACH frequencies are reused loosely, there is little interference on the BCCH frequencies of the strongest neighbour cells of a MS coming from other BCCH frequencies. Since BCCH frequencies are taken from a continuous frequency band, there is only negligible adjacent channel interference from non-BCCH frequencies.

Hence, the field strength (FS) measurements $S_{BCCH}(c)$—measured in dBm—reported by a MS for any strong neighbour cell c approximate the maximum carrier strength $C_{BCCH}(c)$ which this MS would experience if it were served by this particular cell. Because there is no power control (PC) on the BCCH frequency, $C_{BCCH}(c)$ directly approximates the potential carrier strength for each TS on the BCCH frequency. For every non-BCCH channel, $C_{BCCH}(c)$ is the maximum carrier strength to be expected when the BTS is transmitting at maximum power.

In the following we will describe how to estimate interference strength.

Figure 4:
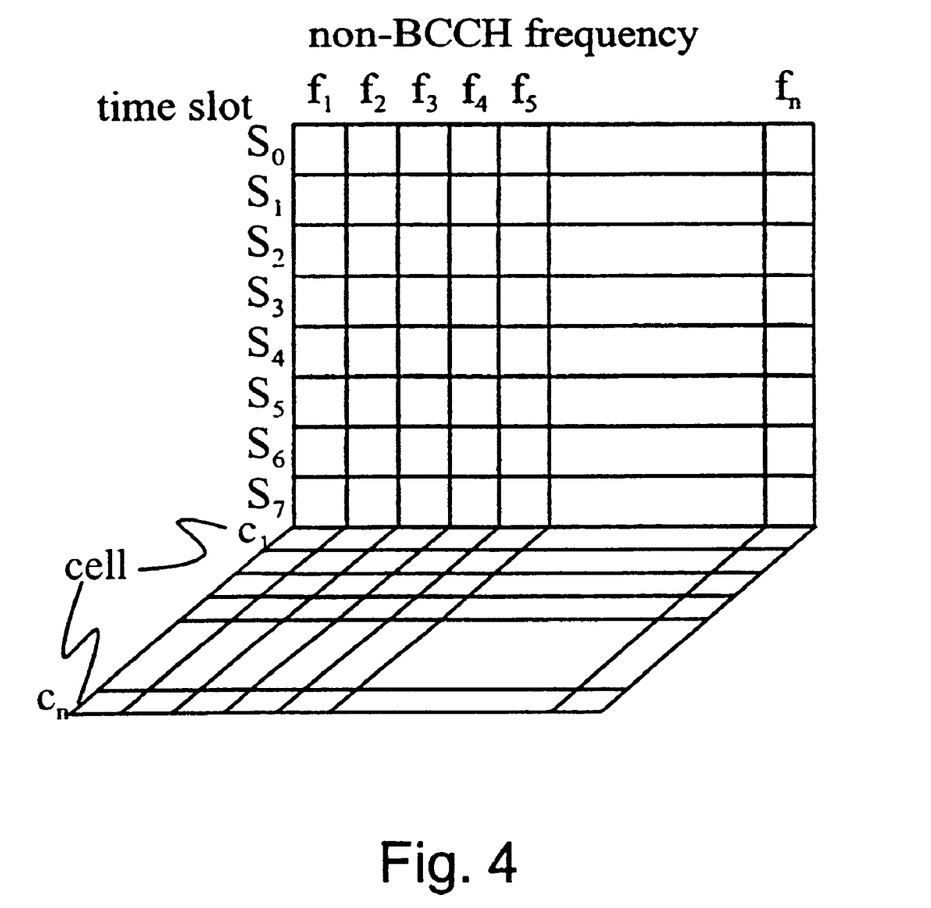
FIG. 4 shows a BSC real time matrix of BTS transmission power values.

In FIG. 4 the BSC builds a real time matrix of BTS transmission power values for all frequencies and all time slots for all cells. The measured field strength of the BCCH carrier neighbour is used together with the BTS transmission power values to calculate the contribution of the co-channel interference from the neighboring cell.

In more detail than in FIG. 4 the BSC identifies the cell corresponding to each BCCH FS measurement reported by a MS knowing the BCCH frequency and the base station identify code BSIC. Although BSIC and BCCH frequency in general do not uniquely identify a cell, the BSC identifies the cell nevertheless by other means. For example, if the BSC is pre-programed with the geographical locations of all BTSs, it can pick among all those cells with the right BSIC and BCCH frequency the one whose BTS is geographically closest to the serving BTS.

Having identified a reported cell c, the BSC can now identify all allocated channels in this cell c (FIG. 4). For each channel with frequency f and time slot s, the BSC knows the STS transmission power level PWR(c,f,s) which is used. A channel with the MS's serving frequency and with a TS transmitted simultaneously with the MS's serving TS, is an actual co-channel interferer and contributes to the total interference I in the C/I affecting the MS. In the following equations both simultaneous TSs at BTS and MS are denoted by s, although they actually may have different TS numbers in their respective TDMA frame domains, since frame boundaries are not synchronised (but known by the BSC).

Any other channel is a potential interferer and contributes to be total interference I in C/I which the MS would experience if it were served by the corresponding channel of its serving cell. Similarly, actual and potential adjacent channel interferers can be identified. The co-channel interference $i_c(c,f,s)$ at a MS coming from a neighbour cell c at frequency f and in TS s is directly given by the FS measurements reported by the MS for the cell's BCCH frequency, i.e. $C_{BCCH}(c)$, if the maximum BTS power, i.e. the power PWR(c, $f_{BCCH}$) on the BCCH, is used. This is because the physical transmission characteristics are sufficiently similar across the whole frequency band not depending on frequency, e.g. whether GSM 900, GSM 1800 or GSM 1900. For dual band, single BCCH networks, the different signal attenuation in the two bands must be taken into account This relation is known and currently used in coverage planning.

Figure 5:
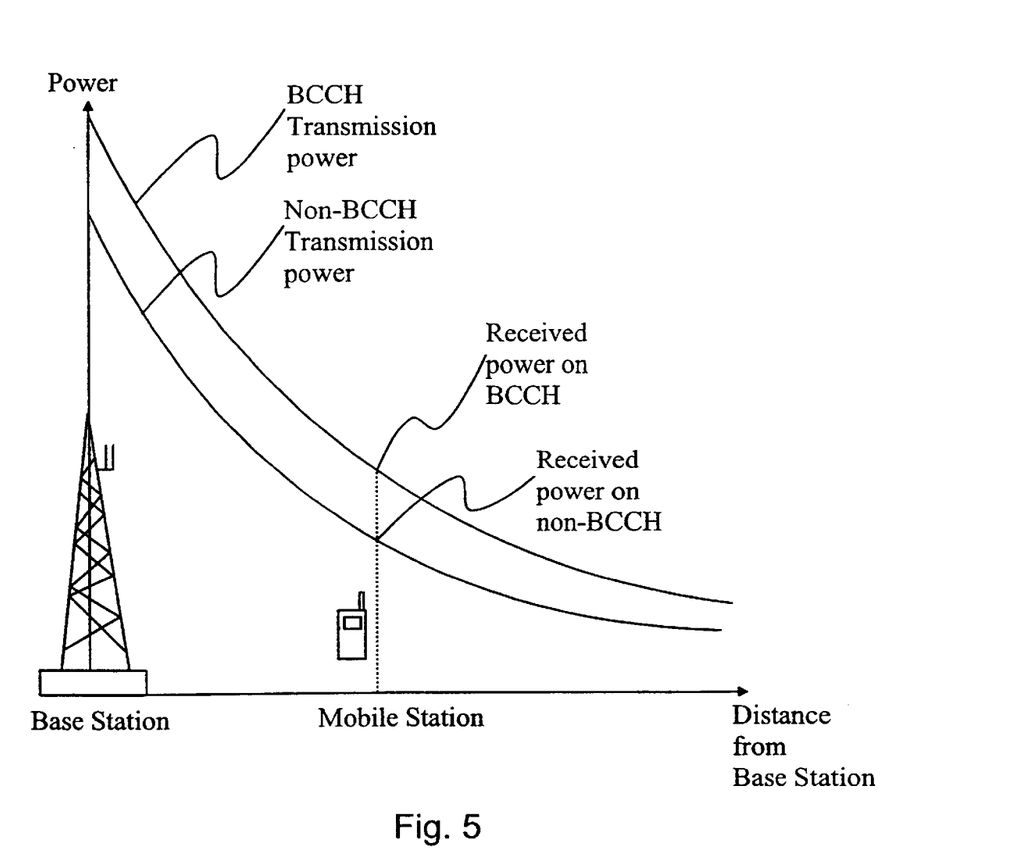
FIG. 5 shows a relationship between BCCH and non-BCCH power.

If the interfering BTS's transmission power is reduced (due to PC), then the FS measurements $C_{BCCH}(c)$ on the BCCH frequency must be corrected towards a lower value in order to not overestimate the interference at the MS. In a reasonable approximation, the difference between full and actual BTS transmission power (in dBm) is subtracted from the measured FS (FIG. 5), i.e.

$$I_c(c,f,s) = C_{BCCH}(c) - (PWR(c,f_{BCCH}) - PWR(c,f,s)).$$

This approximation is also used in the standard GSM power budget calculation for power budget handovers and HO candidate evaluation. Additionally, but not necessarily, more sophisticated correction methods taking into account non-linear propagation characteristics could be considered.

The following describes further refinements of the interference calculation:

Adjacent channel interference can be handled in either of two ways.

In one solution, simply a correction to the interference at the MS as it would hold for co-channel interferers is applied. The magnitude of this correction can be either derived from GSM requirements (e.g. −30 dB), general typical values (e.g. −40 dB) or individual values specified for each BTS and pre-programmed into the BSC. In this solution, there is only one interference value I (and one C/I) per frequency, TS and MS, for combined co- and adjacent channel interference.

In a more sophisticated solution, the BSC calculates separate Interference values I (and separate C/I) for co- and adjacent channel interference, for each frequency, TS and MS. Instead of applying a correction, lower thresholds for C/I evaluation and handover decisions are used. For example, thresholds could be 18 dB lower for adjacent channel C/I than for co-channel C/I.

Downlink discontinous transmission (DTX) can also be taken into account by applying another correction to the interference. The most natural correction is the relative amount of frames used for transmission expressed in dB. The relative amount of frames used for transmission is either calculated by the BSC on the basis of the actual traffic or a typical value is used; e.g. −3 dB if only about half of the bursts are transmitted due to DTX. Similarly, for interfering channels, in which not all frames are used for transmission (e.g. half rate voice, dedicated signalling), corresponding interference reductions may be calculated.

For the purpose of allocating a channel which does not continuously use every TDMA frame, e.g. for half rate voice or dedicated signalling, interference contributions can be calculated for each potential channel allocation. An alternative, much simpler solution is to use the interference contributions calculated for a full channel as a statistical approximation. At this point, the BSC knows all interference contributions $I_c(c,f,s)$ at each MS coming from cell s on frequency f and in TS s.

For each MS, the BSC now "adds up" all those interference contributions $I_c(c,f,s)$ coming from different cells for each frequency and TS. This results in reasonable estimates for the total interference I on each frequency f used in the strongest neighbour cells for each of the 8 TSs, including the serving TS.

$$I(f,s) = I_c(c_1,f,s) \oplus I_c(c_2,f,s) \oplus \ldots$$

This "adding up" cannot be done in a physically exact way since this would require knowledge of the actual time series of all interfering signals. In a first approximation, however, the interference is summed in the signal amplitude domain, i.e. all interference contributions are mathematically added after expressed in √W instead of dBm, and the result in √W is then expressed again in dBm. Thus, the "⊕" operation is defined by:

$$I_1 \oplus I_2 = 20 \log(10^{(I_1/20)} + 10^{(I_2/20)})$$

Again it will be understood that more sophisticated algorithms as known from radio propagation prediction models can be used. For those non-BCCH frequencies f which are not used in any of the reported neighbour cells, the interference estimate I(f,s) is set to a minimum value, for all TSs s. For those non-BCCH frequencies f which are used by the serving cell in a TS s, the interference estimate I(f,s) is set to a maximum value, except, of course, for the serving TS.

In the following it will be described how to estimate the carrier strength on the serving cell.

The FS measurements $S_0$ of the MS on the serving channel (frequency $f_0$, and TS $s_0$) represent the combined effect of actual carrier signal $C_0$ and actual interference $I_0$, i.e. $S_0 = C_0 \oplus I_0$. The actual interference $I_0$, has been calculated before: $I_0 = I(f_0, s_0)$. Therefore, the actual carrier strength $C_0$ can be calculated by subtracting $I_0$ from $S_0$ in the signal amplitude domain. For the purpose of intra-cell HOs, an estimate for the maximum potential carrier strength $C_{BCCH}(c_0)$ on the serving cell $c_0$ is helpful. Although $C_{BCCH}(c_0)$ is not measured by the MS, it can be inferred from the actual transmission power $PWR(c_0, f_0, s_0)$ and the BCCH transmission power on the serving cell, both known by the BSC:

$$C_{BCCH}(c_0) = C_0 + (PWR(c_0, f_{BCCH}) - PWR(c_0, f_0, s_0))$$

In summary, the BSC knows, for each MS that it serves (i.e. for each MS that is in the area of a BTS that the BSC controls), actual carrier strength and interference on the serving channel and, furthermore, potential maximum carrier strengths and potential interference for each frequency used in the strongest calls and for each of the MS's 8 TSs. C/I ratios are simply given by C–I, but the BSC tracks C and I independently. These C and I calculations are performed for each MS whenever the BSC receives a MS's measurement report, i.e. usually every 480 ms and at least every 960 ms. The BSC keeps a running average of all these estimates, in order to smoothen out statistical scatter. The size of the averaging window may be a fixed parameter or determined by the measurements themselves or by other criteria. The size of the averaging window is expected to be in the range of 2 to 10 measurement reports, depending on the traffic load, speed of the MS, size of the cell, etc.

The measurements are reported back by a MS in a single measurement report, and are taken in a time period of 480 ms. The measurement report arrives at the BTS about 420 ms after the end of the measurement period (for a full rate channel). Because of this delay, the BSC actually has to keep a history of the channel configuration data required for estimating C/I, i.e. channel allocations. BTS transmissions powers, and possibly DTX use. Changes in channel configuration usually occur during a measurement period. C and I estimates are calculated for each channel configuration occurring during a single measurement period and are weighted with the fraction of time within a measurement period for which the different channel configurations were valid.

The exact amount of the delay with which measurement reports arrive at the BSC cannot be determined by the BSC since the Time Slot Alignment solution provides only synchronisation between BTSs on the air interface but not between BSC and BTSs on the Abis interface. This is not relevant if changes in the channel configuration data do not occur too often, i.e. many times per measurement period. However, a better approximation than assuming a fixed delay of e.g. 420 ms can indeed be obtained. The BTS knows when a MS's measurement period takes place within its own time domain since it has to adjust its own measurement period of uplink measurements to occur simultaneously with the MS downlink measurement period, according to GSM specifications. Therefore, the BTS can tag the measurement results it sends to the BSC with an indication of the point in time when a measurement period has ended. Time can be indicated by frame number, for example. Such a time tag is compatible with current GSM specifications, since the "Measurement Result" Abis message includes an optional data field "supplementary information" for operator specific data.

The BSC can now store the history of channel configuration data with BSC-internal time references relative to the frame number received together with the last measurement report. The only unknown delay remaining is now given by the delay over the Abis interface, which is short compared with the 480 ms of a measurement period.

The running averages for C and I are not affected by HOs, since they refer to a specific MS and not to a cell area. There is no need to restart the averaging process after a HO. HOs do not cause any additional latency to the continuous C/I evaluation process.

In the following it will be described how the aforementioned C/I are used for dynamic channel allocation.

First initial channel allocation is described:

For the initial channel allocation, the BSC has not yet received any measurement data from the MS, and therefore cannot assess the potential C/I of any channel. Assigning a non-BCCH channel to the MS would run a high risk of generating high interference either at the MS in question or at other MSs. A simple solution is to always allocate a channel on the BCCH frequency whenever the BSC is not able to reliably estimate the potential C/I at the MS. As soon as enough measurement results have arrived from the MS to the BSC to reliably estimate the potential C/I at the MS, the BSC should command a handover to a non-BCCH channel (either in the same or another cell). Having traffic on non-BCCH channels is preferred anyhow since downlink PC is not available on the BCCH frequency.

If no BCCH channel is available when it is needed, the BSC might allocate a non-BCCH channel in spite of the high interference risk This risk should be minimised by choosing the channel with minimal potential interference determined by averaging all potential interference of all MSs in the cell.

Traditonal means to solve access congestions problems may also be applied in the case of not having a free BCCH channel, i.e. queuing, directed retry, or high-priority HOs to free a BCCH channel.

Secondly, C/I-based handovers is described:

The principles for basing HO decisions on C/I criteria made possible by the invention are explained. The detection of certain C/I conditions is described in this document as based on running averages and thresholds, as in the standard GSM HO and PC algorithms. However, the method according to the invention does not require conventional thresholds.

Continuous monitoring of actual and potential C/I estimates enable the BSC not only to detect the need for HOs but furthermore also allows to assess the current overall C/I distribution in a cell and in a whole BSC area. The ultimate goal is to spread actual C/I evenly over a cell and, as far as coverage and hard capacity limitations allow, over a BSC area. The BSC uses a C/I target range to achieve this. There are different methods to choose a C/I target range. For example:

1. The operator chooses a fixed C/I target range for the network or for individual cells, in order to maintain certain quality. The BSC applies soft-blocking of traffic as required to maintain the C/I target. The subscribers can be classified to users groups like e.g. business or private clients and the quality the user gets is depending on that.

2. The operator chooses how the C/I target range should depend on the local traffic load, in order to semi-automatically trade quality for capacity.

3. The BSC autonomously sets the C/I target to the current average actual C/I in the cell or the BSC area. This maximises quality for the given current traffic load.

However, soft capacity is limited by hard capacity, which is given by the number of installed TRXs for each cell. Therefore, hard capacity translates to a minimum C/I target.

The relationship beetween handovers and power control will be described as follows:

With the invention, PC and HO processes interwork more closely and PC works more effectively. By monitoring the actual C/I estimate, the BSC can detect a necessity of PC or a HO for each MS. If C/I crosses a lower C/I threshold, this triggers an increase in BTS transmission power if possible or a HO. If C/I crosses an upper C/I threshold, this indicates a MS with unnecessarily high C/I and triggers a decrease in BTS transmission power if possible or a HO. Whether the better choice is a change in STS transmission power or a HO, is determined by calculating the potential effects of both possibilities on the MS in question and on other MSs. The BSC performs an evaluation procedure for HO candidates and PC.

With the invention there are many more possible HO candidates than usual. A HO candidate is defined by candidate cell, candidate frequency, and candidate TS. Any combination of these can change at HO. In principle, a HO is possible to any neighbour cell for which the MS has reported a valid BSIC, any frequency from the whole set of non-BCCH frequencies, and any TS. To save BSC processing time, not every HO candidate can be evaluated with the same sophistication, since the total number of HO candidates can be quite large. For example, in a system with 20 non-BCCH frequencies and 6 reported neighbour cells there are 20×6×8−1=959 HO candidates per MS. Therefore, whole groups of HO candidates will be discarded immediately on the basis of simple threshold conditions. For example, if the potential interference at a MS for a particular combination of frequency and TS is above a certain threshold, no HOs to this frequency and TS will be considered, regardless of the HO candidate cell. Spealdng in general terms, HO candidates are evaluated according to their potential C/I. For each MS and for each HO candidate, the BSC can estimate how a HO decision would impact the actual C/I of the MS in question and the actual C/I of all other MSs under the control of the BSC. HO candidates can be discarded or assigned priorities as determined by this process. More specifically, consider a MS $m_0$ currently served by a cell $c_0$ on a frequency $f_0$ and in a TS $s_0$, and a HO candidate cell $c_1$, candidate frequency $f_1$ and candidate TS $S_1$, (Note that this includes intra-cell HOs since $c_1$ may equal $c_0$). The maximum potential C/I of this MS after HO is given by carrier strength $C_{BCCH}(c_1)$ and interference $I(f_1,s_1)$. If this maximum potential C/I is considered to be too low, e.g. below a lower C/I target threshold, this HO candidate is discarded. This maximum potential C/I is considered to be too high, e.g. above an upper C/I target threshold, the potential effects of PC on the MS $m_0$ after HO are considered, with the same methods as described earlier. A candidate BTS transmission power $PWR_{HO}(c_1,f_1)$<$PWR(c_1,f_{BCCH})$ is calculated such that the corresponding potential (below maximum) C/I falls within the C/I target range, preferably near the upper C/I target threshold. This potential C/I is given by the same interference $I(f_1,s_1)$ and the candidate carrier strength $C_{HO}(c_1)$<$C_{BCCH}(c_1)$ calculated in this procedure.

If the calculated candidate BTS transmission power $PWR_{HO}(c_1,f_1)$ falls below the minimum allowed BTS transmission power, it has to be reset to tis minimum. Then the resulting potential C/I is above the upper C/I target threshold, and the HO candidate is either discarded or kept with lower priority.

The potential impact of this HO candidate on other MSs (in other cells) is twofold. First, the interference $I(f_0,s_0)$ at each MS m, which receives the serving cell $c_0$ strongly and which is also served by frequency $f_0$ and in the simultaneous TS $s_0$ would decrease by $I_c(c_0,f_0,s_0)$. If the corresponding potential C/I of the potentially affected MS $m_1$ is above the upper C/I target threshold, then the priority of the HO candidate is lowered. The higher the BTS transmission power for $m_1$ is, relative to the serving BTS's maximum transmission power, the more the priority is lowered.

The second impact is that the interference $I(f_1,s_1)$ would increase at each MS $m_1$ which receives the candidate cell $c_1$ strongly and which is already served by the candidate frequency $f_1$ and in the simultaneous TS $s_1$. The magnitude of this increase is calculated by the BSC, taking into account the BCCH carrier strength as received by the potentially affected MS and the difference $PWR(c_1,f_{BCCH})-PWR_{HO}(c_1,f_1)$ between BCCH power and candidate power for the MS $m_0$. If a potential C/I for MS $m_1$ calculated from this potential interference and from its actual carrier strength is below the upper C/I target threshold, the HO candidate is kept with higher priority. If the potential C/I for MS $m_1$ calculated from the same potential interference and its maximum potential carrier strength (on its serving BTS) instead of its actual carrier strength is below the upper C/I target, the HO candidate is kept with lower priority or discarded. The more the MS $m_1$'s carrier strength would have to increase to keep its potential C/I below the upper C/I target threshold, the more the priority is lowered.

A method for power control that can be used in the method according to the invention is described in the following:

The effects of a potential change in transmission power on a MS $me_0$'s serving channel are estimated by the BSC in a similar way as for HO candidate evaluaton. A candidate BTS transmission power for a MS $m_0$'s serving channel is calculated such that the corresponding potential C/I at $m_0$ falls with the C/I target range. If this candidate BTS transmission power fails outside the serving cells allowed range for BTS transmission power, no PC is possible.

A potential decrease in BTS transmission power is always beneficial. PC is then considered with high priority. In case of a potential increase in BTS transmission power, the additional interference to other MSs is estimated as discussed for HOs. The priority for PC is lowered if the C/I target will not be met for affected MSs. Depending on the resulting priority for PC and the HO priority for the HO candidate with highest priority, the BSC decides whether it is better for the overall C/I evaluation to perform a change in BTS transmission, power or a HO.

Handover considering C/I value is described in following.

The BSC selects the HO target among the HO candidates according to the priorities established in the HO candidate evaluation procedure. Since these priorities were based on the potential effects of a HO on the affected MSs' C/I, this HO target selection will homogenise the overall C/I distribution. The BSC commands a synchronised HO according to standard GSM procedures.

The BSC chooses the initial BTS transmission power on the new channel to be the candidate BTS transmission power calculated before.

The BSC may even choose the lowest possible initial MS transmission power on the new channel. This initial MS transmission power on the new channel is approximately given by the MS transmission power on the old channel, modified by the difference in BTS transmission power between the new and old channel. A security margin might be necessary if the relationship between uplink and downlink transmission characteristics is different between old and new serving BTS. For example, the new serving BTS might lack receive antenna diversity gain. If any other MS requires a higher transmission power on its serving channel as an effect of the HO and as determined during HO candidate evaluation, the BSC issues a corresponding PC command. After an inter-cell HO has been successfully executed, a MS receives a new neighbour list; a new neighbour list can also be sent after intra-cell HOs. Preferably, this neighbour list is not the universal neighbour cell list which is broadcasted on the BCCH for idle mode procedures, but a dedicated neighbour cell list, based on the local environment of each MS. At intra-BSC HOs, the BSC sends as required, a dedicated neighbour cell list to the MS which is based on different characteristics it has determined for the MS. Such characteristics are C and I estimates for particular neighbour cells, the location of the MS, the speed of the MS, the rate of change of the MS's speed, local traffic load, or layer relationships, or any combination thereof.

Basically the above said regarding transmitting dedicated neighbour lists means transmitting a macro neighbour list for a fast moving MS and a micro neighbour list for a slow moving MS. The specific neighbour lists are sent according to specific network conditions such as in instances of potential drop of call due to rapid field drop.

Inter-BSC handovers (HOs) are treated as in current GSM systems. C/I-based HOs supersede current intra-BSC HOs due to power budget, low downlink quality, and low downlink FS. Power Control based on downlink FS and quality target ranges is not needed any more. Although downlink C/I-based HOs should also catch most HO conditions in uplink, the necessity for uplink HO criteria still remains, to cope with problematic uplink radio propagation conditions, which do not show up in the downlink C/I evaluation. Uplink PC remains unchanged.

With C/I HOs, the BSC minimises the network from an interference point of view, which also maximises soft capacity. There is a balance between soft capacity and quality which is controlled by the C/I target. A higher C/I target leads to higher quality but reduced capacity and vice versa. Traffic HOs are carried out to cope with local traffic load in accordance with the C/I target, which in turn can be re-evaluated depending on the local traffic load.

In the following the number of neighbouring cells is discussed based on an exemplary implementation:

Accordingly, in a preferred embodiment each C/I estimate only takes the interference from the 6 strongest neighbour cells into account. The BSC chooses the neighour list to make best use of the 6 strongest neighbours.

If there are indeed more than 6 significant neighbour cells, it is also quite likely that the relative order changes with time. For example, different cells of similar strength might be reported as the currently $6^{th}$ strongest neighbour cell at different times. In this way, the BSC can determine the interference at a MS coming from more than 6 neighbour cells, but with less statistics than for cells continuously reported among the 6 strongest. Currently. Mobile Assisted Frequency Allocation (MAFA) is being standardised. It will allow to temporarily suspend measurements of cells from the neighbour cell list, and to measure the FS on other frequencies instead, although BSIC reporting is not required here. This also allows specification of neighbours just for the purpose of C/I estimates. whereas all HO candidate cells have to be present in the standard GSM neighbour list.

The dedicated neighbour lists feature, creates an interim solution for MAFA, without requiring any modification to the MS.

Only downlink C/I is considered. Uplink measurements can certainly also be evaluated for C/I considerations. In general, comprehensive C/I evaluation as presented here should be sufficient to achieve reasonable interference management also in uplink direction. Nevertheless, at least some of the usual processes to deal with uplink are required to deal with special problems which manifest themselves only in uplink direction.

As already discussed, correctly adding up interference contributions is not straight forward and, likewise, the effects of PC, DTX, etc. can only be calculated approximately. The inaccuracy of carrier strength and potential interference estimates coming from the neglected inter-BCCH interference can be reduced by increasing the BCCH reuse factor. Using more frequencies for the BCCH and less for the non-BCCH transmissions might translate to higher overall capacity or quality if this significantly increases the accuracy of C/I estimates.

Although the method to achieve synchronisation is fault tolerant, there is always a chance that time slot alignment might be temporarily lost. In this case the interference coming from and coming to the non-synchronised cell cannot be assessed. This is similar to the case of initial channel allocation and should be treated similarly, e.g. BCCH channels should preferably be allocated first, until synchronisation is recovered.

The method according to the invention can theoretically be applied not just to one BSC, but to the whole network. However, in practice since current GSM specification does not allow for direct communication between BSCs, realisation of the invention is feasible only within a single BSC area. The same holds true also for synchronisation. However, of course the method can implemented at each BSC area, thus covering the whole mobile network.

In the future this limitation might be overcome with the help of a near IP based interconnection of any base station subsystem (BSS) under development. However, continuously exchanging the channel configuration data between BSCs as it is required for the calculation of actual and potential C/I estimates, requires high realtime capacity, which might not be available.

Otherwise, using the method for the whole network would necessitate frequency planning at BSC boundaries. Furthermore, some inter-BSC co-ordination can be delegated to the network management system (NMS). For example, the NMS can gather C/I statistics from different the BSCs to evaluate network wide C/I distributions and choose C/I targets for each BSC or for each cell.

Base stations (BTSs) which do not support the invention do not necessarily have to be removed from the network. BTSs which do not allow to assign a frequency for each TS could still be used in a limited way, as long as frequencies can be reassigned to non-BCCH transmissions at any time and do not require to temporarily take the BTS offline. Determination of C/I would still be possible in the same way, but far interference information would be available for far fewer frequencies, since each measured BCCH frequency only refers to few other frequencies, given by the number of TRXs. The choice among HO candidates would narrow down considerably, since frequencies can be reassigned to TRXs only if there is at most one channel allocated on a TRX.

The channel allocation comprises allocating a radio channel to the connection between the fixed transceiver and the radio station and the radio channel is defined by a time slot and in FDMA (frequency division multiple access) system the radio channel is defined by a carrier frequency.

In another embodiment the invention provides a method for processing all the field strength measurements reported by the mobile station (MS) in addition to estimating carrier-to-interference strength ratios (C/I) at each MS. This is achieved by taking into account information in the BSC of differences in time and transmit power between BTS transmissions. The C/I estimates comprise the actual C/I which affects each MS, and the potential C/I which would affect each MS should a particular channel allocation be made at a particular BTS to a particular MS, i.e. the assignment of a particular frequency and particular time slot. These C/I estimates are used to control the handover and power control process, i.e. to determine when a particular MS is handed over to a particular channel on which BTS and to choose the lowest possible BTS transmission power for each MS.

Frequencies are not assigned on a 'TRX' basis but on a 'TRX and time slot' basis (except for the BCCH). Furthermore, the allocated frequencies remain unchanged from frame to frame, i.e. no frequency hopping takes place. Because there is no fixed assignment of frequencies to cells and because handovers are synchronised, intra- and inter-cell handovers become very much alike and channel allocation becomes truly dynamic, based only on C/I evaluation and the current traffic load.

These features optimise the capacity benefits made possible by time slot alignment since they make possible a much tighter frequency reuse than is possible with present capacity solutions. Depending upon the particular network configuration, an effective reuse between 3 and 3.5 is possible. Handovers are performed whenever required to smoothen out the C/I level for the network. This spreading process is limited by the number of TRXs installed in each BTS. This comes quite close to the ultimate goal of frequency planning and channel allocation, which is to keep C/I homogeneously distributed among all MSs.

Figure 6:
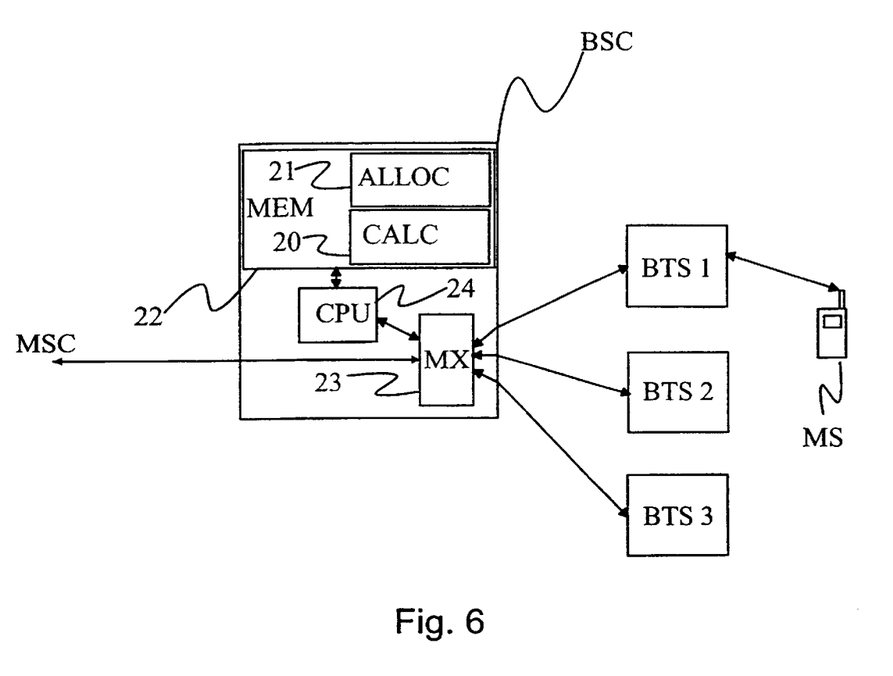
FIG. 6 shows a description of a BSC.

FIG. 6 shows a possible implementation of base station controller BSC according to the invention. The BSC comprises means for calculating a signal to interference estimate (CALC)20, and means for performing channel allocation (ALLOC)21. In practice these calculation (CALC) and allocation (ALLOC) functions can be implemented as software stored in a memory (MEM)22 and performing the method according to the invention and a microprocessor that controls the function of the BSC and for runs programs in the memory 22. Tho means (ALLOC) for allocating channels controls signals to BTSs and MSCs, Mat for example goes to the BTSs via a multiplexer (MX)23.

It will be understood that the invention is not restricted to the aforedescribed and illustrated exemplifing embodiments thereof and that modifications can be made within the scope of the following claims and knowledge of the man skilled in the art.

What is claimed is:

1. A method for a radio channel allocation based on at least one signal to interference criterion in a telecommunication network, comprising at least one fixed transceiver, the at least one fixed transceiver configured to have connections with mobile radio stations the method comprising:

calculating first signal to interference estimates for at least two mobile radio stations connected to the network, the at least two mobile radio stations comprising a first mobile radio station connected to the network on a first channel and at least one second mobile radio station;

calculating a second signal to interference estimate for the first mobile radio station, the second signal to interference estimate estimating a case that the first mobile radio station is served by a second channel;

calculating a third signal to interference estimate for the at least one second mobile radio station, the third signal to interference estimate estimating a case that the first mobile radio station is served by the second channel;

comparing the second and the third signal to interference estimates to the at least one signal to interference criterion; and performing the channel allocation for the first mobile radio station based upon a result of the comparing.

2. A method according to claim 1, wherein calculating the first, second and/or third signal to interference estimate comprises making a measurement at the radio station.

3. A method according to claim 2, wherein calculating the first, second and/or third signal to interference estimate is based upon:

measuring a received power level at the radio station on a channel for which the transmission power level is known, and information of the power level of any radio channel transmitted by the same fixed transceiver.

4. A method according to claim 3, wherein calculating the signal to interference estimate is performed for every possible radio channel between the radio station and the fixed transceiver for which the radio station has reported a measurement.

5. A method according to claim 1, wherein said telecommunications network is a mobile telecommunication network comprising a plurality of mobile stations, a plurality of base stations and at least one base station controller controlling a plurality of base stations, and the method comprises performing the calculating at the base station controller.

6. A method according to claim 1, wherein the channel allocation comprises allocating a transmission power level to the connection between the fixed transceiver and the radio station.

7. A method according to claim 1, wherein the channel allocation comprises allocating a radio channel to the connection between the fixed transceiver and the radio station.

8. A method according to claim 7, comprising using time division multiple access in transmissions between the fixed transceiver and the radio station, and defining the radio channel by a time slot.

9. A method according to claim 7, comprising using frequency division multiple access in transmissions between the fixed transceiver and the radio station, and defining the radio channel by a carrier frequency.

10. A method according to claim 7, wherein during an active radio connection, the allocation procedure causes the connection to be handed over from the first channel to the second channel.

11. A method according to claim 10, wherein the first channel is a radio channel between a first base station and the radio station, and the second channel is a radio channel between a second base station and the radio station.

12. A method according to claim 10, wherein both the first and the second channels are radio channels between the base station and the radio station.

13. A method according to claim 1, wherein calculating the first signal to interference estimate comprises calculating the first signal to interference estimate for all the mobile stations connected to the network.

14. A method according to claim 1, comprising forming a measure of the signal to interference distribution over a plurality of radio stations and using said measure as said criterion.

15. A method according to claim 14, comprising setting a target range for said measure.

16. A method according to claim 15, comprising considering a traffic load situation in the network in setting said target range.

17. A method according to claim 1, comprising:
sending a list of neighboring cells to the mobile radio station, said list indicating the frequencies the radio station shall perform measurements on, and selecting the frequencies of the list based on at least one particular condition of the mobile radio station.

18. A method according to claim 17, wherein said particular condition comprises the speed at which the mobile radio station is moving.

19. A method according to claim 17, wherein the network comprises at least two overlaying network layers, each layer having different base station transmission power ranges, and said particular condition comprises the current network layer.

20. A method according to claim 17, wherein said particular condition comprises the current location of the radio station.

21. A mobile communications network comprising a number of base stations, each base station being capable of transmitting radio signals to and receiving radio signals from the area of an associated cell for communication with a mobile station in the associated cell, and at least one base station controller to which a number of said base stations are connected, the network comprising:
means for calculating first signal to interference estimates for at least two mobile radio stations connected to the network, the at least two mobile radio stations comprising a first mobile radio station connected to the network on a first channel and at least one second mobile radio station;
means for calculating a second signal to interference estimate for the first mobile radio station, the second signal to interference estimate estimating a case that the first mobile radio station is served by a second channel;
means for calculating a third signal to interference estimate for the at least one second mobile radio station, the third signal to interference estimate estimating a case that the first mobile radio station is served by the second channel;
means for comparing the second and the third signal to interference estimates to at least one signal to interference criterion; and
means for performing channel allocation for the first mobile radio station based upon operation of said comparing means.

22. A base station controller for supervising a number of base stations connected to the base station controller and for supervising communication to mobile stations being connected to one of the base stations over a radio connection, the base station controller comprising:
means for calculating first signal to interference estimates for at least two mobile radio stations connected to the network, the at least two mobile radio stations comprising a first mobile radio station connected to the network on a first channel and at least one second mobile radio station;
means for calculating a second signal to interference estimate for the first mobile radio station, the second signal to interference estimate estimating a case that the first mobile radio station is served by a second channel;
means for calculating a third signal to interference estimate for the at least one second mobile radio station, the third signal to interference estimate estimating a case that the first mobile radio station is served by the second channel;
means for comparing the second and the third signal to interference estimates to at least one signal to interference criterion; and
means for performing channel allocation for the first mobile radio station based upon operation of said comparing means.

23. A mobile communications network comprising a number of base stations, each base station being capable of transmitting radio signals to and receiving radio signals from the area of an associated cell for communication with a mobile station in the associated cell, and at least one base station controller to which a number of said base stations are connected, the network comprising at least one unit configured to:
calculate first signal to interference estimates for at least two mobile radio stations connected to the network, the at least two mobile radio stations comprising a first mobile radio station connected to the network on a first channel and at least one second mobile radio station;
calculate a second signal to interference estimate for the first mobile radio station, the second signal to interference estimate estimating a case that the first mobile radio station is served by a second channel;
calculate a third signal to interference estimate for the at least one second mobile radio station, the third signal to interference estimate estimating a case that the first mobile radio station is served by the second channel;
compare the second and the third signal to interference estimates to at least one signal to interference criterion; and
perform channel allocation for the first mobile radio station based upon the comparing.

24. A base station controller for supervising a number of base stations connected to the base station controller and for supervising communication to mobile stations being connected to one of the base stations over a radio connection, the base station controller configured to:
calculate first signal to interference estimates for at least two mobile radio stations connected to the network, the at least two mobile radio stations comprising a first mobile radio station connected to the network on a first channel and at least one second mobile radio station;
calculate a second signal to interference estimate for the first mobile radio station, the second signal to interference estimate estimating a case that the first mobile radio station is served by a second channel;
calculate a third signal to interference estimate for the at least one second mobile radio station, the third signal to interference estimate estimating a case that the first mobile radio station is served by the second channel;
compare the second and the third signal to interference estimates to at least one signal to interference criterion; and
perform channel allocation for the first mobile radio station based upon the comparing.

* * * * *